United States Patent
Uhler et al.

(10) Patent No.: US 7,228,220 B2
(45) Date of Patent: Jun. 5, 2007

(54) DEVICE FOR ADAPTIVE DISTANCE AND SPEED CONTROL WITH HAVING TORQUE DAMPENING

(75) Inventors: Werner Uhler, Bruchsal (DE); Michael Weilkes, Sachsenheim (DE); Michael Scherl, Bietigheim-Bissingen (DE); Harald Michi, Oelbronn-Duerrn (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/532,171

(22) PCT Filed: May 19, 2003

(86) PCT No.: PCT/DE03/01603
§ 371 (c)(1),
(2), (4) Date: Nov. 2, 2005

(87) PCT Pub. No.: WO2004/041579

PCT Pub. Date: May 21, 2004

(65) Prior Publication Data
US 2006/0095192 A1  May 4, 2006

(30) Foreign Application Priority Data
Nov. 2, 2002  (DE) .............................. 102 51 037

(51) Int. Cl.
*B60T 7/12* (2006.01)
(52) U.S. Cl. .................. 701/96; 701/300; 180/174; 340/903
(58) Field of Classification Search .................. 701/96, 701/301, 300; 342/455, 104, 109, 70; 340/903, 340/435, 901, 436, 444, 441; 180/170, 174
See application file for complete search history.

(56) References Cited

U.S. PATENT DOCUMENTS

| | | | |
|---|---|---|---|
| 4,763,746 A * | 8/1988 | Ochiai ........................ | 180/179 |
| 4,938,604 A * | 7/1990 | Naito et al. .................... | 701/95 |
| 5,023,792 A * | 6/1991 | Shioyama ..................... | 701/97 |
| 5,121,323 A * | 6/1992 | Yamamoto et al. ........... | 701/93 |

(Continued)

FOREIGN PATENT DOCUMENTS

DE  100 19 190   10/2001

(Continued)

OTHER PUBLICATIONS

Winner et al., "Adaptive Cruise Control System Aspects and Development Trends", SAE Transactions, Society of Automotive Engineers, Inc., Warrendale, PA, US, vol. 105, No. 961010, 1996, pp. 1412-1421.

*Primary Examiner*—Tuan C To
(74) *Attorney, Agent, or Firm*—Kenyon & Kenyon LLP

(57) ABSTRACT

A device for adaptive distance and speed control in motor vehicles, comprising a sensor device for measuring the distance and relative speed of a target object located in front of the vehicle; a regulating device, which has a distance control function to regulate to a specific distance to the target object and outputs temporally changeable actuating variables ($a_m$, $a_b$) to actuating elements of the drive and/or brake system of the vehicle; and a torque dampener for limiting the temporal changes of the actuating variables, characterized by a dynamic device that detects sudden changes in the traffic situation detected by the sensor device and restricts the function of the torque dampener according to the situation while maintaining distance and speed control.

9 Claims, 3 Drawing Sheets

U.S. PATENT DOCUMENTS

| | | | |
|---|---|---|---|
| 6,430,494 B1 * | 8/2002 | Inoue et al. | 701/96 |
| 6,460,645 B1 * | 10/2002 | Asada et al. | 180/179 |
| 6,496,770 B2 * | 12/2002 | Winner et al. | 701/96 |
| 2001/0014846 A1 * | 8/2001 | Sawamoto et al. | 701/96 |
| 2002/0032514 A1 * | 3/2002 | Kuroda et al. | 701/96 |

FOREIGN PATENT DOCUMENTS

| | | | |
|---|---|---|---|
| JP | 62132047 A | * | 6/1987 |
| JP | 01088282 A | * | 4/1989 |

* cited by examiner

DEVICE FOR ADAPTIVE DISTANCE AND SPEED CONTROL WITH HAVING TORQUE DAMPENING

BACKGROUND INFORMATION

The present invention relates to a device for adaptive distance and speed control in motor vehicles as it is described, for instance, in SAE paper no. 96 10 10 "Adaptive Cruise Control, System Aspects and Development Trends", Winner et al., 1996. Such a device, which is also referred to as ACC system (Adaptive Cruise Control), allows the speed of the vehicle to be automatically controlled to a driver-selected target speed. Furthermore, objects located in front of the vehicle are detected by a sensor device, for instance with the aid of a radar sensor. When the sensor device detects a target object, typically a vehicle traveling immediately ahead in the own traffic lane, the speed of the own vehicle is reduced, if necessary by intervening in actuating elements of the drive and/or brake system, in such a way that the target object is tracked within a certain safety distance. This distance is a function of the speed and determined by a time gap, which is driver-selectable within certain limits and which indicates the time interval at which the own vehicle is following the vehicle driving ahead.

Utilizing the radar sensor, it is possible to directly measure not only the distance, but also the relative speed of the preceding vehicle. As an option, the relative speed may also be determined by time derivation of the measured distance. When the absolute speed of the vehicle driving ahead, i.e., the sum of the speed V of the regulated vehicle and the measured relative speed Vr, increases beyond the driver-desired speed Vset, setpoint speed Vsetpoint—calculated within the framework of distance control—of the regulated vehicle is restricted to desired speed Vset. When the regulated vehicle is traveling at desired speed Vset and approaching a vehicle driving ahead at a slower speed, the distance control function ensures that the speed V of the regulated vehicle will be gradually reduced when falling below a certain distance that is a function of the relative speed, taking the driving comfort into account, so that the speed is adapted to the speed of the preceding vehicle while the distance to the preceding vehicle is reduced to the value determined by the time gap.

To increase the driving comfort, the conventional ACC systems include a so-called torque dampener, which restricts the actuating variables that are output to the actuating elements and/or their change as a function of time. For instance, the torque dampener has the function of limiting the positive or negative setpoint accelerations, represented by the actuating variables, as well as their time derivatives, so that abrupt transitions are avoided, thereby achieving a smooth operation that is perceived as comfortable.

In addition, vehicle guidance systems have been proposed, which, possibly in combination with an ACC system, have a so-called crash mitigation function, which automatically initiates full braking when a crash with another vehicle seems imminent, naturally without torque dampening, so that the collision may still be prevented or the results of the collision at least be reduced.

SUMMARY

An example device in accordance with the present invention may have the advantage that in traffic situations characterized by increased dynamics, although no collision danger exists, it allows a better adaptation of the system response to the traffic events, thereby allowing a driving style that more closely corresponds to the operating behavior the driver perceives as natural.

This example device includes a dynamic device which under certain conditions completely or partially suspends the torque dampening within the framework of a normal distance and speed control and in this way permits a faster response to sudden changes in the traffic situation. In particular, this device provides for a better control of situations in which, perhaps as a result of a change in target object, a switch of actuating elements becomes necessary, i.e., a switch from braking to accelerating or vice versa. A typical example is the situation where a preceding vehicle decelerates strongly in preparation for a turn and then disappears from the detection range of the sensor device once it has turned off, so that a faster and more distant vehicle will then be selected as new target object. In this situation, the natural reaction of a driver will be to immediately release the brake as soon as the turning vehicle has left the own traffic lane and to switch to the accelerator in order to accelerate the own vehicle moderately, yet promptly. The device according to the present invention simulates this behavior by suspending the torque dampener, whereas in conventional ACC systems the function of the torque dampener has the result that the braking deceleration to zero is reduced only gradually before a switch is made to the actuating element of the drive system and the vehicle is accelerated again. The same applies to the reverse case as well, where a slower-moving vehicle suddenly gets into one's own lane when the own vehicle is accelerating fairly strongly.

Conventional ACC systems are generally designed for driving at relatively high speed on express highways or well developed state roads, that is, for traffic situations that are characterized by relatively large distances between vehicles and relatively low dynamics of the traffic events. The present invention is especially advantageous in connection with endeavors to broaden the application range of the ACC system to the lower speed range, so that the advantages of the ACC system are also able to be utilized in more dynamic traffic situations, for example when driving on congested expressways or state highways or, in a further development stage, in city traffic as well. Since sudden changes in the traffic situation are expected more often in these application areas, in particular a change in the target object, the example device according to the present invention is therefore particularly useful in this context.

A useful criterion for suspending or restricting the torque dampener function is that a change in target object is detected and a switch of actuating elements is triggered in response. If the change in actuating elements is made in the direction of a switch from an intervention in the brake system to an intervention in the drive system, only the torque dampener for the brake system is preferably suspended while it remains active for the drive system. This corresponds to the natural behavior of a driver, who immediately releases the brake when an obstacle suddenly disappears and then accelerates moderately. In the event of a switch of actuating elements in the reverse direction, the torque dampener for the drive system will be inactivated correspondingly, while it remains active for the brake system.

Instead of completely inactivating the torque dampener for the actuating elements, it is also possible to merely attenuate the effect of the torque dampener in that the limit values for the acceleration or deceleration or their time derivatives are shifted within the sense of an increase in the allowance. The extent of the shifting of the limit values may also be a function of a parameter selectable by the driver, so that the driver, depending on his or her personal preferences, may choose between a more dynamic or a more sedate driving style.

As an alternative or in addition, the detection of traffic situations during which the torque dampener should be suspended completely or partially may also be carried out in that an evaluation variable is calculated within the framework of the control algorithm on the basis of the distances measured by the sensor device and the relative speeds of the detected objects, the evaluation variable representing a measure for the urgency of the required acceleration or especially the deceleration of the vehicle. The limits established by the torque dampener may then be further extended with increasing urgency, up to a complete inactivation of the torque dampener.

The inactivation or restriction of the torque dampener function preferably remains in force only during a limited period of time. In the case of a switch of actuating elements, the torque dampener may be fully reactivated again once the change to the new actuating element has been completed, possibly using a certain time delay. In a triggering of the torque dampener as a function of urgency, the full function will be restored again as soon as the urgency has returned to a normal level.

In the situation-specific adaptation of the torque dampener, other input variables may be taken into account as well, for instance the street type (express highway or inner-city streets), the driving speed or the yaw rate of the vehicle. When the yaw rate is high, it is useful to restrict the torque dampener function to a lesser degree since load changes and especially a switch between braking and accelerating have a special effect on driving comfort during cornering.

BRIEF DESCRIPTION OF THE DRAWINGS

An exemplary embodiment of the present invention is shown in the figures and explained in greater detail below.

DETAILED DESCRIPTION OF EXAMPLE EMBODIMENTS

Figure 1:
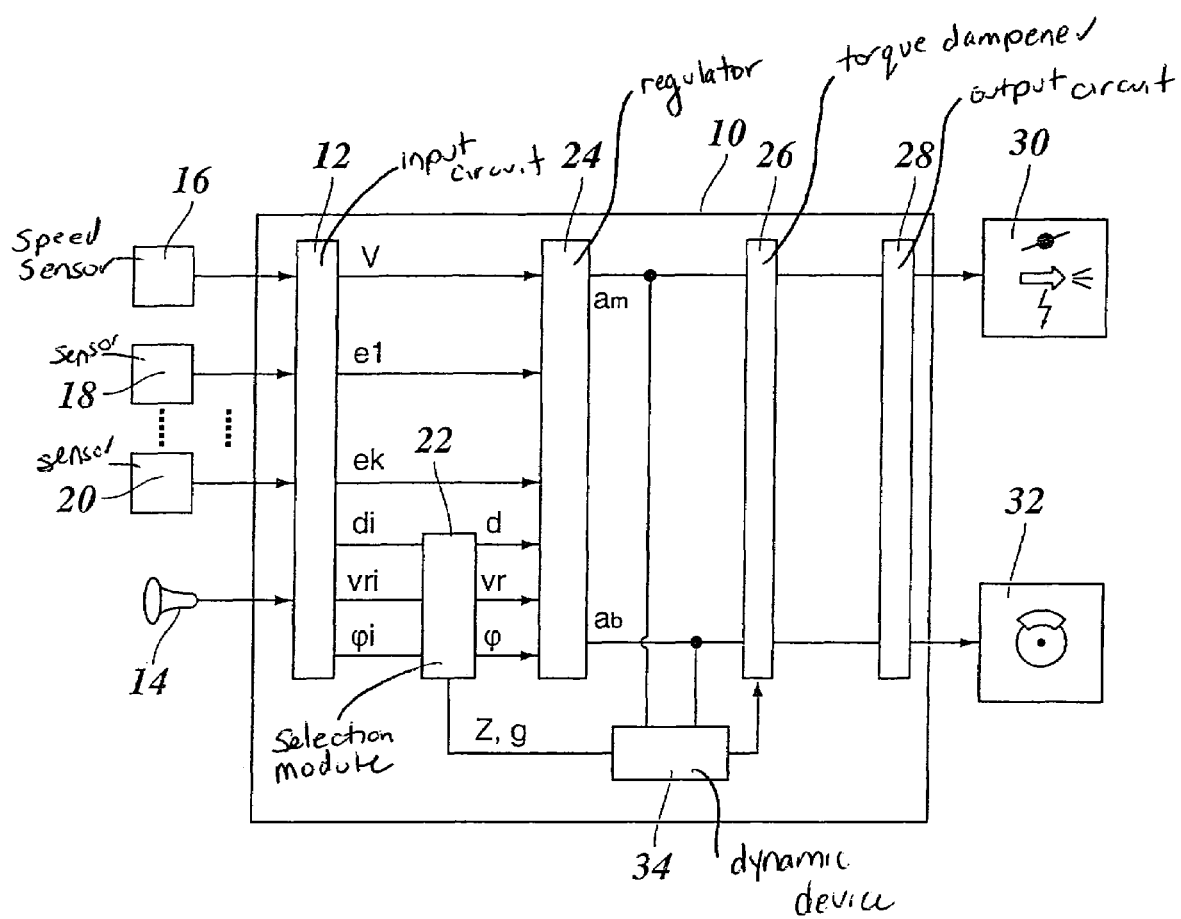
FIG. 1 shows a block diagram of a device for adaptive distance and speed control having torque dampening.

The example device for adaptive distance and speed control shown in FIG. 1 includes a regulating device 10, which is formed, for example, by one or several microcomputer(s) and receives signals from a sensor device 14 via an input circuit 12. Sensor device 14 is an angular-resolution radar sensor, for instance, which measures the distances and relative speeds as well as the azimuth angles of objects located in front of the vehicle. Input circuit 12 also receives signals from a speed sensor 16 for measuring the speed V of the regulated vehicle, as well as signals from additional sensors 18, 20, which are shown here only summarily, and other input variables e1–ek, which are relevant for the regulation of the yaw rate, road incline and similar data.

On the basis of the signals from sensor device 14, input circuit 12 generates at least three input variables for each object i detected by this sensor device, these variables indicating object distance di, relative speed vri of the object and also azimuth angle ($\phi$i of the object. A selection module 22 checks for each object on the basis of the distance and angle data whether this object is traveling in the traffic lane in which the regulated vehicle is driving or in an adjacent lane or whether it is at the edge of the roadway. If several objects are located in the traffic lane of the regulated vehicle, the object that has the highest relevance for the distance control will be selected as target object from among these objects. Generally, the target object will be the vehicle driving immediately in front, i.e., the object in the traffic lane of the regulated vehicle that has the lowest object clearance. Distance d, relative speed vr and azimuth angle $\phi$ of this object are conveyed to a regulator 24, which also receives the other input variables V and e1–ek.

If a target object is present, regulator 24 regulates the speed of the vehicle with the aid of conventional control algorithms in such a way that the target object is tracked at a certain distance. This distance is a function of the speed and in most cases is defined by a driver-selectable time gap, which indicates at what time interval the regulated vehicle is following the vehicle driving in front.

If no target object is present, regulator 24 regulates the speed of the vehicle to a driver-selected desired speed. This desired speed will be set even if the absolute speed of the preceding vehicle is greater than the desired speed.

For the purposes of regulation, regulator 24 calculates actuating variables $a_m$ and $a_b$, which are output to actuating elements 30, 32 of the drive system or the brake system of the vehicle via a torque dampener 26 and an output circuit 28. Actuating variables $a_m$ and $a_b$ are calculated by regulator 24 in such a way that the own speed is regulated to the desired speed or the setpoint speed dictated by the vehicle driving ahead in the most stable manner and that a meaningful approach strategy will be adopted when approaching a target object, and the setpoint distance to the target object will then be regulated with the greatest possible steadiness. Actuating variable $a_m$ represents a positive or negative acceleration, which is to be generated with the aid of actuating element 30 of the drive system, and actuating variable $a_b$ represents a negative acceleration (deceleration), which is to be generated using the brake system.

Torque dampener 26 is used to increase the driving comfort and has the function of restricting the actuating variables calculated by regulator 24 in such a way that extreme accelerations or decelerations of the vehicle, which are perceived as uncomfortable, are avoided. Furthermore, torque dampener 26 also restricts the temporal variations of actuating variables $a_m$, $a_b$, at least the first derivations thereof, so that abrupt changes in the acceleration or in the braking deceleration and also abrupt changes between braking and accelerating are avoided as well. In the process, torque dampener 26 also ensures the absence of conflicts of actuating variables $a_m$ and $a_b$, so that, in particular during a braking operation, no acceleration command will be output to the drive system at the same time. If a braking operation becomes necessary and a brake command is output to actuating element 32, it is thus the case that the output of an acceleration command to actuating elements 30 of the drive system will be suppressed and vice versa. In the following, these processes are to be called switch of actuating elements.

Actuating variables $a_m$ and $a_b$ calculated by regulator 24 are also supplied to a dynamic device 34, which is therefore able to detect a switch of actuating elements. In addition, dynamic device 34 receives a signal Z from selection module 22, which indicates a change in the target object. For instance, if the vehicle driving immediately in front leaves the traffic lane of the regulated vehicle, selection module 22 will report a target object loss provided no other vehicle is located in the lane, or it selects as new target object the particular vehicle that will then have the shortest distance. These events are also reported to dynamic device 34 via signal Z.

In the example shown, selection module 22 is configured in such a way that it assigns an evaluation variable to each detected object or to at least each of the objects located in the own traffic lane, on the basis of input variables di, vri, φi according to a particular function rule or on the basis of a stored, multi-dimensional characteristic field, this evaluation variable indicating the relevance of this object for the distance control. The particular object for which the evaluation quantity is greatest will then be selected as the target object. This object need not necessarily always be the vehicle driving immediately in front, but sometimes could also be the next-to-last vehicle if this next-to-last vehicle is braking suddenly and is therefore deemed particularly relevant because of the strongly negative relative speed vri. Evaluation variable g of the selected target object, i.e., the maximum of all object-specific evaluation variables, is transmitted to dynamic device 34 together with signal Z. With the aid of this evaluation variable g, dynamic device 34 is thus able to determine the "urgency" required in a response to the target object.

Figure 2:
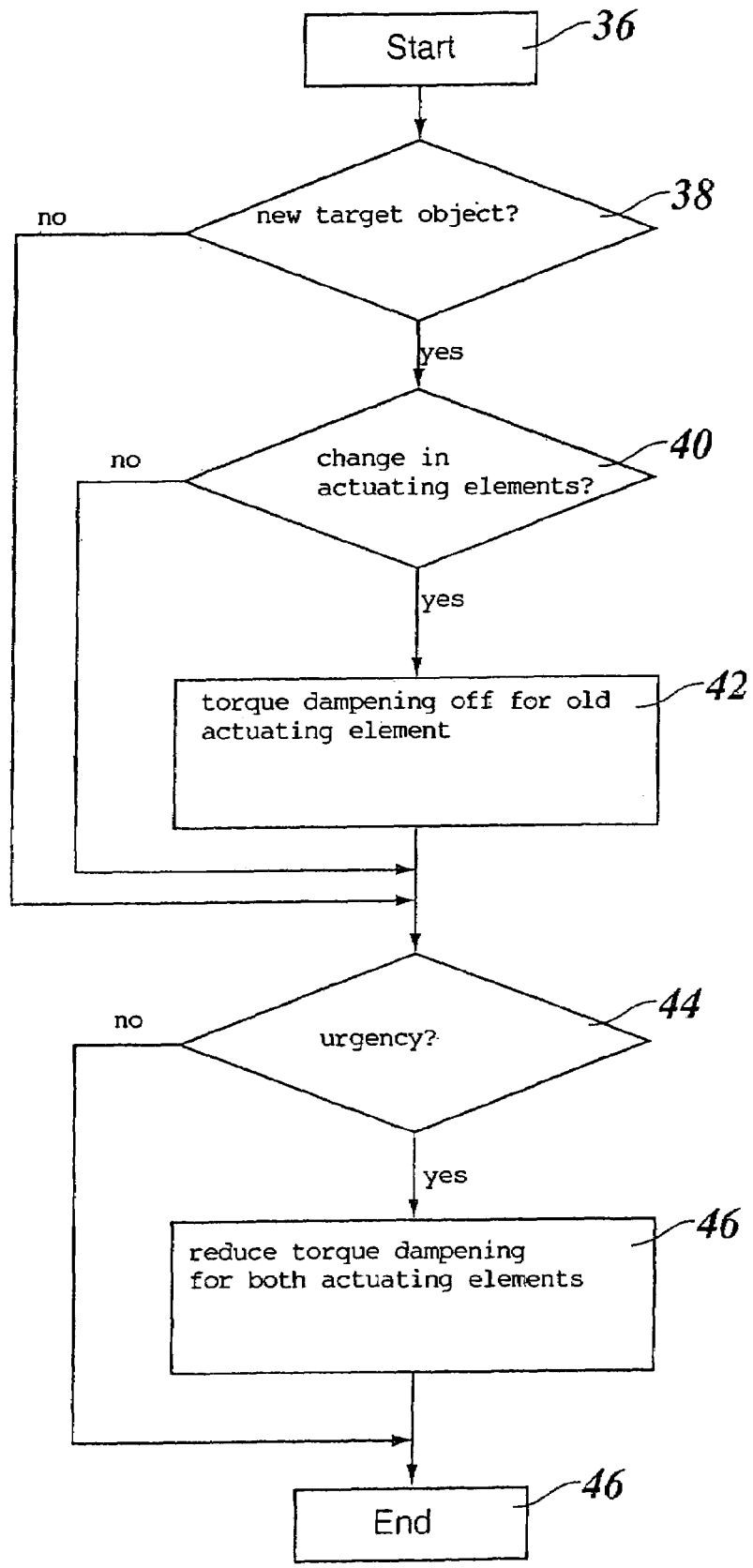
FIG. 2 shows a flow chart to elucidate an example method of functioning of the device.

On the basis of this information, dynamic device 34 triggers the functioning method of torque dampener 26, as shall be explained in greater detail with the aid of the flow chart illustrated in FIG. 2.

The flow chart in FIG. 2 describes a program routine that is periodically executed by dynamic device 34, for example in synchronism with the measuring cycles of sensor device 14. After the start of the program routine in step 36, it is checked in step 38 with the aid of signal Z whether a target object change has taken place. If this is the case, it is ascertained in step 40 on the basis of actuating variables $a_m$ and $a_b$ whether a switch of actuating elements should be implemented in response to the change in target object. Even if this is the case, the torque dampener for the currently active actuating element is turned off in step 42. That is to say, if the brake has been active until now and acceleration is then selected again, the torque dampening for actuating element 32 (brake) is suspended, with the result that the actuating command for the brake is reduced to 0 immediately and will not be reduced to 0 in a gradual manner at a limited temporal variation rate, as would otherwise be the case because of the effect of torque dampener 26. The torque dampening for the new actuating element, namely actuating element 30 in the example discussed, remains active in the meantime, so that the acceleration of the vehicle starts gently as is desirable from the standpoint of driving comfort.

Once the switch of actuating elements has been concluded, the torque dampening for the old actuating element (brake) will be reactivated again once a specific time interval has elapsed, although this is not shown in detail in the flow chart.

If the check in step 38 or step 40 has had a negative result, step 42 will be skipped, i.e., the torque dampener remains fully active.

In step 44, it is then ascertained on the basis of evaluation variable g whether a particular urgency is warranted in the response to the instantaneous target object. In the example shown, this check is performed not only after a switch of actuating elements, but also during the continued tracking of the current target object. For example, it is also possible to detect situations in which the target object suddenly changes its state of motion, for instances initiates full braking.

If increased urgency has been determined in step 44, the torque dampening for both actuating elements will be attenuated to a lesser or greater degree in step 46, depending on the urgency. In this context, "attenuate" means that the limit values for the positive acceleration and their time derivative set in torque dampener 26 are increased, namely according to a monotonously increasing function as a function of the urgency represented by evaluation variable g, and that the limit values for the negative accelerations and their time derivative are reduced according to a monotonously decreasing function as a function of g. In the extreme case, when g has very high values, this may even lead to a complete deactivation of the torque dampener. Due to this consideration of the urgency in the torque dampening, the device is able to respond to dynamic changes in the traffic situation in a more flexible manner and with shorter response times, without the comfort being adversely affected in the usual case. If no increased urgency is detected in step 44, step 46 will be skipped and the program routine concluded by step 48.

Selection module 22, regulator 24, torque dampener 26 and dynamic device 34 are shown as separate blocks in FIG. 1, but simply for the purpose of illustration. In practice, these functions may also be implemented by a single microprocessor.

The effect achieved by dynamic device 34 will now be explained in an example with the aid of the speed-time diagram in FIG. 3 and acceleration-time diagram 4.

Figure 3:
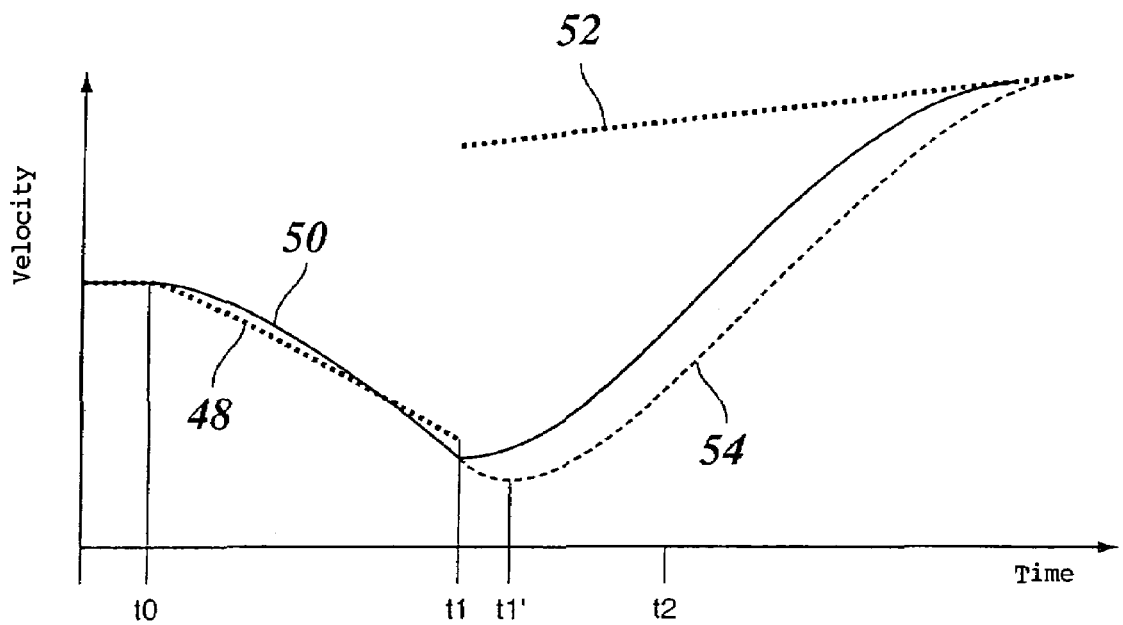
FIG. 3 shows a speed-time diagram to illustrate the effect of the device.
Figure 4:
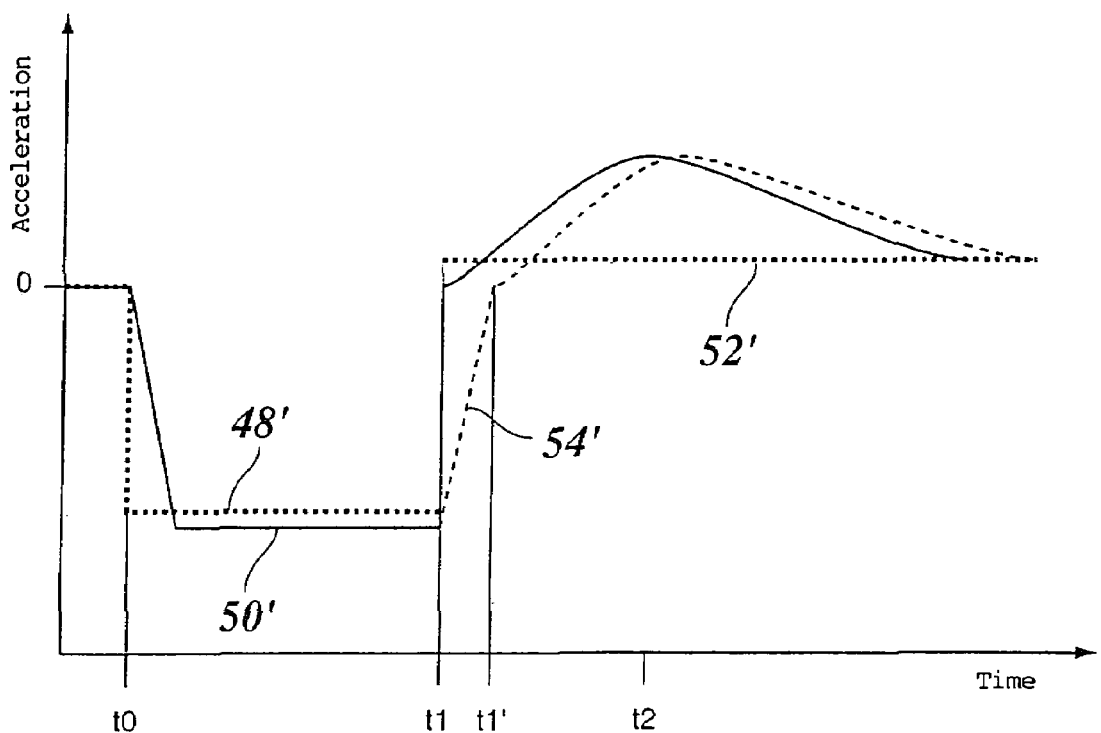
FIG. 4 shows an associated acceleration-time diagram.

The bold and dotted curve 48 in FIG. 3 represents the speed of a first target object, for example the speed of a vehicle driving immediately ahead, which travels at a constant speed up to time t0 and then brakes heavily. Curve 48' in FIG. 4 illustrates the corresponding acceleration. As can be seen, the deceleration of the target object occurs abruptly at time t0. Regulator 24 responds by a deceleration of the own vehicle, for instance by outputting actuating variable $a_b$ to the brake system. However, torque dampener 26 ensures that the braking deceleration increases to the final value only gradually, at a restricted temporal change rate. This is illustrated by speed curve 50 in FIG. 3 and the corresponding acceleration curve 50' in FIG. 4.

At instant t1, the target object is lost, for instance because it has turned off or has changed to an adjacent lane. Selection module 22 then selects as new target object a vehicle that is traveling at a higher speed and accelerates gently, as indicated by curves 52 and 52'. If the torque dampener were to remain fully active in this situation, the movement of the regulated vehicle would be represented by speed curve 54 in FIG. 3, sketched as a dashed line, and the corresponding acceleration curve 54' in FIG. 4. Although the obstacle—i.e., the current target object—has long since disappeared, the torque dampening function would result in a further braking of the own vehicle, and the braking deceleration would continue to decrease to 0 again only gradually, at a restricted rate of increase, as can be seen from curve 54'. Consequently, the speed of the regulated vehicle would reach its minimum only at instant t1' (FIG. 3). Only then would an acceleration of the own vehicle begin and the speed be gradually adapted to that of the new target object (curves 52, 52'). This late response to the disappearance of the obstacle is perceived as irritating and intrusive by many drivers (and the following traffic as well).

In the device described here, dynamic device 34 now detects the target object change at instant t1 as well as the actuating element change demanded by regulator 24 (steps 38 and 40 in FIG. 2), whereupon torque dampener 26 is inactivated with respect to the brake system. The braking deceleration is thus abruptly decreased to 0. This manifests itself by a kink in speed curve 50 in FIG. 3 and a sudden change in acceleration curve 50' in FIG. 4. The related slight "jerk" is by no means unwelcome under these special conditions. Subsequently, an immediate acceleration of the own vehicle is initiated, which starts off gently and then becomes stronger, so that the speed of the new target object is attained correspondingly earlier. By this measure, a system reaction is achieved that better corresponds to the natural driving behavior and facilitates the traffic flow. At instant t2, torque dampener 26 is fully reactivated again, so that subsequent changes in the state of motion of the new target object would result in a gentle reaction, at a high level of comfort.

What is claimed is:

1. A device for adaptive distance and speed control in a motor vehicle, comprising:
   a sensor device to measure a distance and a relative speed of a target object located in front of the vehicle;
   a regulating device having a distance control function to regulate to a specific distance to the target object, the regulating device configured to output temporally changeable actuating variables to actuating elements of at least one of a drive system and a brake system of the vehicle;
   a torque dampener configured to limit at least one of: i) the actuating variables, ii) the temporal changes of the actuating variables; and
   a dynamic device configured to detect a sudden change in a traffic situation ascertained by the sensor device and to restrict a function of the torque dampener according to the situation, maintaining distance and speed control;
   wherein the dynamic device is configured to receive the actuating variables conveyed to the torque dampener and to detect a switch of actuating elements as criterion for the sudden change in the traffic situation based on the actuating variables.

2. The device as recited in claim 1, further comprising:
   a selection module configured to select the target object for the distance control and to signal to the dynamic device a change in the target object, the change in target object being a criterion for the dynamic device for detecting the sudden change in the traffic situation.

3. A device for adaptive distance and speed control in a motor vehicle, comprising:
   a sensor device to measure a distance and a relative speed of a target object located in front of the vehicle;
   a regulating device having a distance control function to regulate to a specific distance to the target object, the regulating device configured to output temporally changeable actuating variables to actuating elements of at least one of a drive system and a brake system of the vehicle;
   a torque dampener configured to limit at least one of: i) the actuating variables, ii) the temporal changes of the actuating variables; and
   a dynamic device configured to detect a sudden change in a traffic situation ascertained by the sensor device and to restrict a function of the torque dampener according to the situation, maintaining distance and speed control;
   wherein the dynamic device is configured to restrict or suspend the function of the torque dampener when a switch of actuating elements takes place immediately following a change in the target object.

4. The device as recited in claim 3, wherein, in the switch of the actuating elements, the dynamic device suspends or restricts the torque dampening only for an old actuating element.

5. The device as recited in 3, wherein the dynamic device fully reactivates the torque dampener with a time delay following the switch of actuating elements.

6. The device as recited in claim 3, wherein the dynamic device is configured to receive the actuating variables conveyed to the torque dampener and to detect a switch of actuating elements as criterion for the sudden change in the traffic situation based on the actuating variables.

7. A device for adaptive distance and speed control in a motor vehicle, comprising:
   a sensor device to measure a distance and a relative speed of a target object located in front of the vehicle;
   a regulating device having a distance control function to regulate to a specific distance to the target object, the regulating device configured to output temporally changeable actuating variables to actuating elements of at least one of a drive system and a brake system of the vehicle;
   a torque dampener configured to limit at least one of: i) the actuating variables, ii) the temporal changes of the actuating variables; and
   a dynamic device configured to detect a sudden change in a traffic situation ascertained by the sensor device and to restrict a function of the torque dampener according to the situation, maintaining distance and speed control;
   wherein the torque dampener is configured to restrict positive and negative accelerations of the vehicle, represented by the actuating variables, and time derivatives, to associated limit values in each case, and the restriction of the function of the torque dampener includes a change in the limit values.

8. The device as recited in claim 7, wherein the dynamic device modifies the limit values as a function of an evaluation variable, which is a measure for dynamics of the traffic situation.

9. The device as recited in claim 7, wherein the dynamic device is configured to receive the actuating variables conveyed to the torque dampener and to detect a switch of actuating elements as criterion for the sudden change in the traffic situation based on the actuating variables.

* * * * *